United States Patent
Laforest et al.

(10) Patent No.: US 7,579,828 B2
(45) Date of Patent: Aug. 25, 2009

(54) PROCEDURE FOR LOCATION OF MOBILE MAGNETIC TARGETS

(75) Inventors: Pierre Laforest, Toulouse (FR); Pascal Manet, Venelles (FR)

(73) Assignee: Commissariat a l'Energie Atomique, Paris (FR)

( * ) Notice: Subject to any disclaimer, the term of this patent is extended or adjusted under 35 U.S.C. 154(b) by 440 days.

(21) Appl. No.: 11/290,790

(22) Filed: Nov. 29, 2005

(65) Prior Publication Data

US 2009/0039871 A1    Feb. 12, 2009

(30) Foreign Application Priority Data

Dec. 1, 2004    (FR)    .................................. 04 52831

(51) Int. Cl.
*G01B 7/14* (2006.01)
*G01R 33/00* (2006.01)
*G01C 21/00* (2006.01)

(52) U.S. Cl. .................... 324/207.11; 702/150
(58) Field of Classification Search ............ 324/207.11, 324/207.12, 207.15, 207.16, 207.17, 207.23, 324/207.26, 326, 330, 331; 702/150, 151; 701/300–302
See application file for complete search history.

(56) References Cited

U.S. PATENT DOCUMENTS

| | | | |
|---|---|---|---|
| 5,387,853 A | 2/1995 | Ono | 318/587 |
| 5,684,369 A | 11/1997 | Kim | 318/3 |
| 5,684,396 A | 11/1997 | Aks et al. | 304/207.13 |
| 6,292,758 B1 | 9/2001 | Gilbert et al. | 702/150 |
| 6,539,327 B1 * | 3/2003 | Dassot et al. | 702/150 |
| 6,675,123 B1 | 1/2004 | Edelstein | 702/150 |

OTHER PUBLICATIONS

Overway et al., Evaluation of the Polatomic P-2000 Laser Pumped HE-4 Magnetometer/Gradiometer, IEEEXplore, 2002, all pages.*

* cited by examiner

*Primary Examiner*—Kenneth J Whittington
(74) *Attorney, Agent, or Firm*—Nixon Peabody LLP (57) ABSTRACT

A procedure for locating a mobile magnetic target (2) using magnetic measurements includes determining first and second positions (P1 and P2), and a first possible speed (V) of the target (2) along a first direction (Y), determining a third position on a trajectory (28) defined relative to the first direction as a function of the first possible speed (V) and of a later moment in time, and determining the approach position of the target and its speed as a function of the first, second and third positions.

35 Claims, 6 Drawing Sheets

PROCEDURE FOR LOCATION OF MOBILE MAGNETIC TARGETS

CROSS-REFERENCE TO RELATED APPLICATION

This application claims priority to French Application No. 04 52831, filed on Dec. 1, 2004, entitled: "Procedure for Location of Mobile Magnetic Targets" by Pierre Laforest and Pascal Manet, and was not published in English.

TECHNICAL FIELD AND EXISTING SITUATION

In the field of underwater location, the methods most frequently employed are acoustic methods, such as those which use sonar. Sound waves possess the property of being readily propagated underwater. Nevertheless, although sonar techniques have a relatively long range, when they are on board submarines or buoys they have a low degree of mobility. Acoustic methods are, however, the most commonly used. Other methods are principally based on the detection of magnetic anomalies.

Methods for the location of magnetic dipoles are often based on networks of fixed sensors.

Document U.S. Pat. No. 5,387,853 proposes a method that can be used to detect, locate and determine the dipole orientation by means of a network of fixed sensors or a single sensor which moves in space. The major fault with this method is that it is only valid for fixed targets and is not applicable to moving targets.

U.S. Pat. No. 5,684,396 allows the position and speed of a moving magnetic dipole to be calculated using a network of fixed sensors. From an initial hypothesis of the target trajectory, the field that the sensors would measure if the target was really on this trajectory is calculated. The difference between this field and the field that is actually measured results in a second hypothesis for the trajectory and this loop is reiterated until a trajectory is obtained which best corresponds to the measured field. Once again, this method uses a network of fixed sensors to monitor a zone.

U.S. Pat. No. 6,292,758 allows a trajectory to be determined using a network of fixed sensors and Kalman filter processing.

All these methods use a network of fixed sensors to monitor an area; the target must again pass across this network.

There are few methods based on airborne magnetic detection. The most widely used is the MAD ("Magnetic Anomaly Detection") method.

This method is most widely used in the context of re-location. In other words, a target has already been detected by other means (by sonar, for example) and several sweeps are then carried out with the aim of confirming the presence and position of the target.

It is also used to estimate the magnetic moment of French submersible craft.

Then the target is fixed and its position known by the reconnaissance aircraft. The latter then carries out several sweeps directly above the target, and since the magnetic field modulus is known it can then return information on the modulus of the magnetic moment as follows:

$$\|\vec{B}(P)\| = \frac{\mu_0}{4\pi} \cdot \frac{\|\vec{M}\|}{r^3} \leftrightarrow \|\vec{M}\| = \frac{4 \cdot \pi \cdot r^3}{\mu_0} \|\vec{B}(P)\|$$

Figure 1:
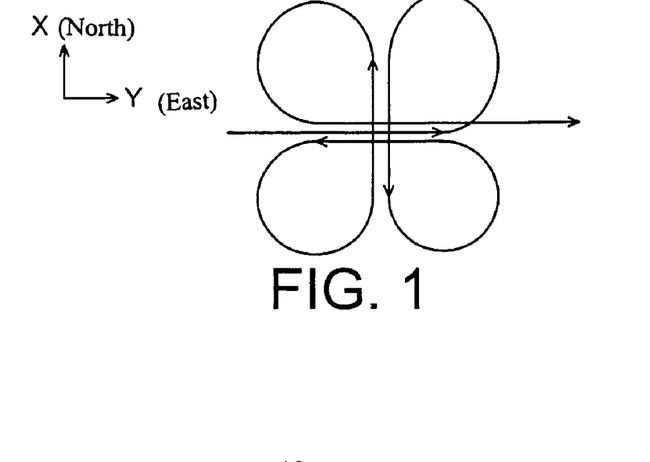
FIG. 1 represents an existing method of re-location.

The sweep strategy used involves what is known as a cloverleaf sweep. The aircraft makes four successive sweeps along the four major headings above the target. Its trajectory is that shown in FIG. 1.

In terms of re-location, this uses the fact that the target is part of the minimum approach distance plane at the moment of CPA.

Figure 2:
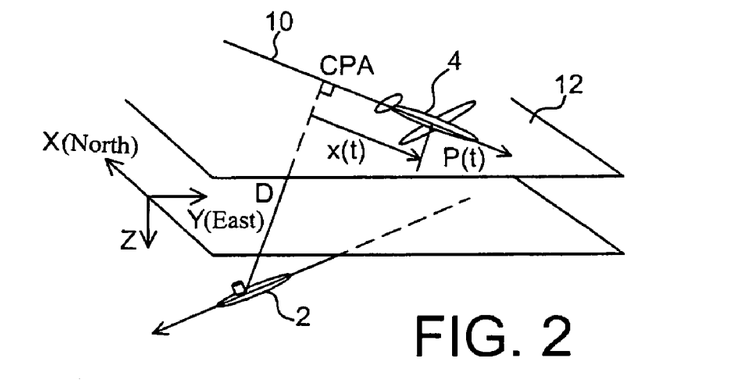
FIGS. 2-5 explain a technique for location by identification of minimum approach distance points.

CPA is a specific geometric location, the point of the minimum approach distance (i.e. Closest Point of Approach). This is the point on the trajectory which is closest to the target. The minimum approach distance is often referred to as D. FIG. 2 shows the trajectory of an aircraft 4 and a target 2, as well as the CPA.

Figure 3:
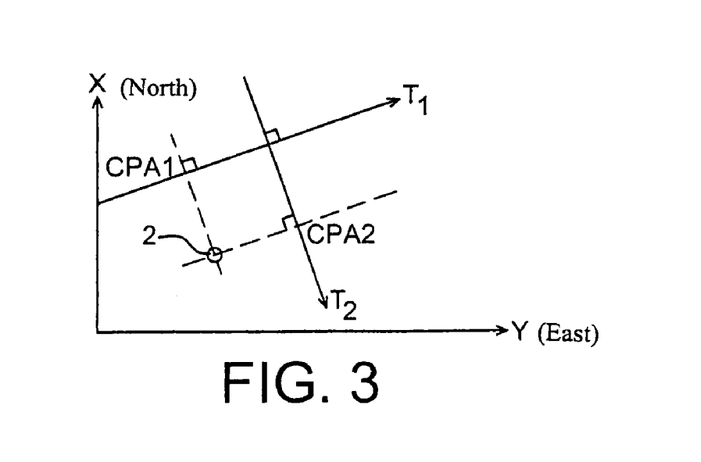

If the aircraft makes two rectilinear sweeps, the target is located at the intersection of the two planes, known as minimum approach distance planes, as shown in FIG. 3.

The location is then valid on condition that the target is immobile. The intersection of the two planes is meaningless if the target moves between the two sweeps. It can therefore be seen that this method is only valid for "cooperating" targets.

There is no existing method then for purely location purposes which is rapid and which does not start from a hypothetical position.

The problem is therefore to develop a strategy for airborne magnetic location which would allow a target that is no longer fixed but in motion to be located using aircraft with their ability to carry out rapid searches.

DESCRIPTION OF THE INVENTION

The invention relates to submarine location using magnetic field measurements.

Submarines may in fact be regarded as being a magnetic dipole (that is, a large magnet). The presence of this magnet in the earth's magnetic field produces a local anomaly which may be identified by measuring the magnetic field modulus.

The invention relates first of all to a procedure for locating a mobile magnetic target using magnetic measurements which include:

a)—the determination of a first and second position and of a first possible speed for the target along a first direction.

b)—the determination of a third position along a trajectory defined, relative to the first direction, as a function of the first possible speed and of a later moment in time.

c)—the determination of the approach position of the target, and of its speed, as a function of the first, second and third positions.

The trajectory defined, relative to the first direction, as a function of the first possible speed and a later moment in time is used to determine a third position for the target.

Such a procedure could involve:

measurements of the magnetic field along the first direction, measurements of the magnetic field along a second direction, opposite to the first, calculation of the target velocity component along the first or second direction and the calculation of the theoretical position of the target as a function of this velocity component at a theoretical later moment in time, measurements of the field along the said trajectory, defined in the light of the determination of the third position of the target, the determination of a moment in time $t'_3$ and of the third position $P_3$.

A procedure which is in accordance with the invention could include the determination of:

a time t1, associated with the first position P1, and of the value D1 of the distance between P1 and the target, a time t2, associated with the second position P2, and of the value D2 of the distance between P2 and the target, The trajectory, defined in the light of the determination of third position of the target, may be perpendicular to the first and the second directions.

Step c) is, for example, an optimisation step, for example by minimisation.

A procedure in accordance with the invention may in addition include measurement of the field at a moment in time t4, along one direction, for example opposite to the trajectory defined in the light of the determination of the third position, and at a fourth point.

Magnetic measurements may be obtained with the aid of a Helium 4 sensor.

The measurement points are the points of minimum approach distance for each of the trajectories, and may be determined by means of filtering.

The target may be a submarine.

Detection may be carried out using an aircraft.

The invention also relates to a device for locating a mobile magnetic target, which includes:

a)—magnetic measuring means or means making magnetic measurements, of the scalar type, b)—means for matched filtering of signals produced by said magnetic measuring means, c)—means determining an approach position of the target and of its speed, as a function of data produced by said filtering means relating to a first, second and third position.

These three positions are, for example, positions of the magnetic measurement device which identifies or corresponds to a specific magnetic data element, for example a maximum of the signal from the magnetic measuring means.

The third position is, for example, located along a trajectory determined as a function of a first possible speed for the target along a first direction.

The magnetic measuring means may advantageously be comprised of a scalar magnetic sensor; for example, a Helium 4 magnetic sensor.

The determining means determining the approach position and the speed preferably involves means optimising the data produced by the filtering device.

Said optimisation means may be a minimisation means.

According to the invention, a reconnaissance aircraft could be equipped with a scalar magnetic sensor, that is, a sensor which measures the magnetic field modulus.

In practical terms, a detection procedure as described in the invention uses such an aircraft, which may carry out rectilinear sweeps or transits above the sea in order to detect this magnetic anomaly.

The invention is used to locate moving targets, that is, it is used to identify the course, speed and depth of the target.

One advantage of the invention in relation to existing techniques is that it uses only a single sensor, which is in particular on board a reconnaissance aircraft, and which therefore has a high projection capacity.

The invention also allows moving targets to be located.

The invention is a procedure for location proper, that is, where nothing is known a priori about the target.

SHORT DESCRIPTION OF THE DIAGRAMS

DETAILED EXPLANATION OF SPECIFIC MODES OF MANUFACTURE

The invention proposes a location procedure which allows the trajectory to be estimated for a target which has magnetic properties or which can be considered to be a magnetic dipole such as, for example, a submarine.

Magnetic detection means, such as a magnetic sensor, are used for this purpose.

Such equipment may be placed on board an aircraft; for example, a reconnaissance aircraft. This equipment is therefore mobile.

The position of the target is a priori completely unknown. It is assumed here that the target is driven in a uniform rectilinear movement, which is in fact the case and which correctly characterises the movement of, for example, a submarine.

Hereafter the target is regarded as being a magnetic dipole. In the case of submarines, this assumption in reality corresponds to a predefined model known as the NATO class model which defines several dipole intensity values for different types of submarines.

The fact that submarines are regarded as dipoles simplifies the expression for the field created in one point in space by this dipole.

This assumption is verified when a sweep is made at a distance which is at least twice that of the characteristic length of the target: A submarine may have a length that is less than 100 m, for example, and in the context of airborne detection, in view of the aircraft's altitude (of the order of 100 m), this is generally within the limits for this assumption.

As a first approximation, the magnetic field modulus at a point P produced by a dipole at O can therefore be expressed as follows:

$$\left\|\vec{B}(P)\right\| = \frac{\mu_0}{4\pi} \cdot \frac{\left\|\vec{M}\right\|}{r^3} \text{ where}$$

$$\vec{r} = \frac{\overrightarrow{OP}}{\left\|\overrightarrow{OP}\right\|} = \frac{\overrightarrow{OP}}{r} \text{ and } \mu_0 = 4\pi \cdot 10^{-7} \ m \cdot \text{kg} \cdot C^{-2}$$

is the permeability of a vacuum.

It should be observed that the reduction in the field varies with $1/r^3$, which means that the range of a magnetic sensor is very short (less than 1 km).

The procedure in the invention can be applied to the determination of any points in space, in particular those located or associated with a trajectory. It is more advantageous however to work with CPAs.

The concept of a CPA, already referred to above, will now be explained.

It is assumed that the space contains direct coordinates (O, $\vec{X}, \vec{Y}, \vec{Z}$) such that O is a fixed point at sea level, X points towards geographic North, $\vec{Y}$ to the East and therefore $\vec{Z}$ points towards the centre of the Earth (FIG. 2).

Note that axes $\vec{X}$ and $\vec{Y}$ are reversed in relation to the common direction.

It is assumed that the target 2 is driven with a rectilinear uniform movement at constant depth with, in particular, $z \geq 0$.

The on-board measurement system itself moves along a straight line 10 which is part of a horizontal plane 12 (FIG. 2).

Its altitude is constant at z<0.

The minimum approach distance plane (PAM) is also defined; this is the plane perpendicular to the trajectory 10, and which contains the target 2 and the CPA.

FIG. 2 illustrates the representations of trajectories of the aircraft 4, of the target 2 and of the CPA.

From the measured magnetic field modulus the CPA information and the value of D is obtained (distance between the target 2 and the CPA) using a filtering method such as a matched filter.

From the known position of the CPA and the value of D a set of points where the target could be found is known: at the moment when the aircraft is located at the CPA, the target is known to be located on a arc of circle 15 (FIG. 4), beneath sea level, perpendicular to the trajectory 10 of the aircraft, whose centre is the CPA point and whose radius is D. In effect, the target is located at the intersection of the minimum approach distance plane and a spherical cup of radius D and whose centre is the CPA.

Figure 4:
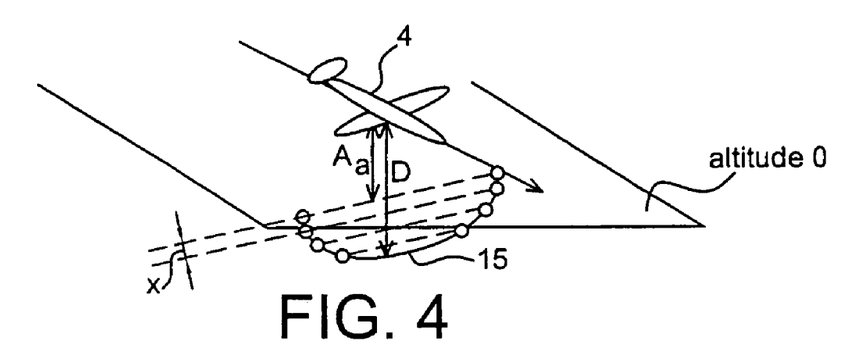

An arc of a circle represents an infinite number of points. To solve this problem, the depth of the submarine is represented as discrete lengths×meters, for example x=10 m, as illustrated in FIG. 4. The set of these possible points for the target is therefore a whole number of sets of points, located along the arc of the circle 15 and spaced x m apart vertically.

Figure 5:
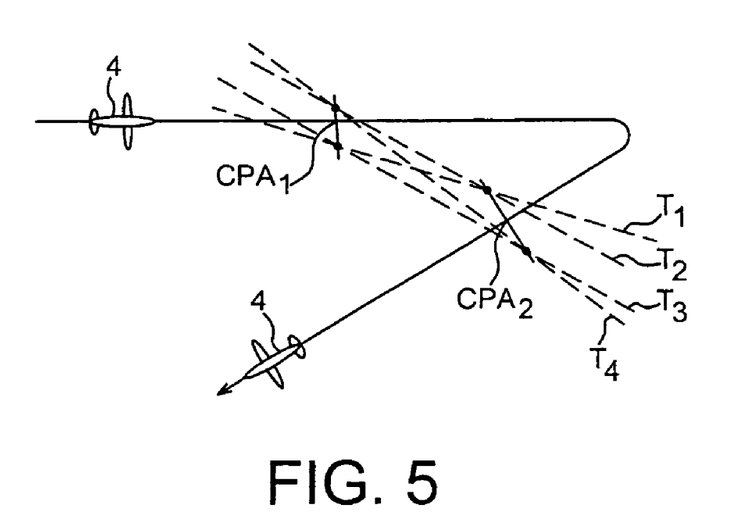

When an aircraft 4 makes two rectilinear sweeps, as shown in FIG. 5, it records a CPA during each of its sweeps (CPA1 and CPA2).

So a pair of solution points exists per depth level and for each CPA, which makes 4 possible solution trajectories for target 2.

For all the depth levels, there are therefore a bundle of possible trajectories T1, T2, T3, T4 for the target, which provide an idea of the actual trajectory, as is shown in FIG. 5.

Figure 6:
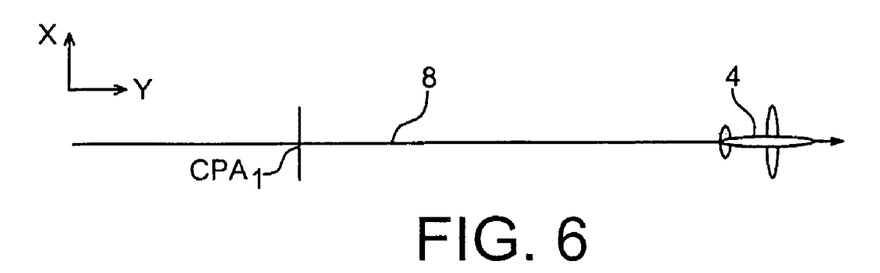
FIGS. 6-12 represent various steps in the procedure as described in the invention.

As described in the invention the reconnaissance aircraft 4 carries out a first rectilinear sweep, or a first sweep along a first trajectory 8 over the sea, as shown in FIG. 6, and during the course of this sweep detects a magnetic signature, in other terms a CPA1.

When the on-board operator decides that the signal is sufficiently strong, that is, when the estimate is sufficiently accurate to carry out a search, a CPA (CPA1) is detected at a time t1.

Figure 7:
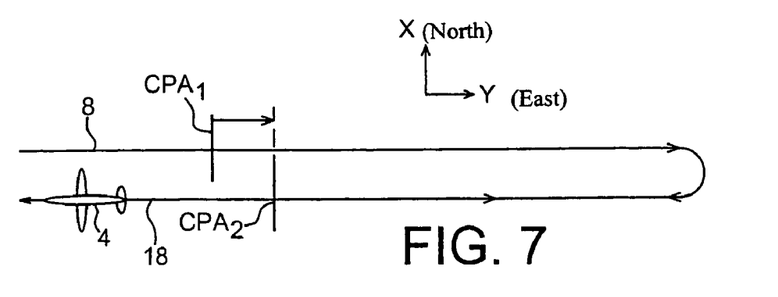

The aircraft then carries out a half-turn and makes a second sweep 18 parallel to the first sweep, but in the reverse direction (FIG. 7). It detects at a second CPA known as $CPA_2$ at a moment in time t2. Knowing the time t2-t1 that has passed between the two CPAs, the speed projection for the target along the axis of the aircraft trajectory (here East-West) can be estimated. Consequently, once the second sweep is completed, information on a component of the speed of the target is available.

The assumption can then be made that the submarine position is changing at a speed V equal to this component along the axis of the second sweep.

The aircraft will then carry out a third sweep or will change its course to move along a third trajectory. This third sweep or this third trajectory is represented orthogonally at Y on FIG. 8, but could cross Y along another angle or at another inclination.

Figure 8:
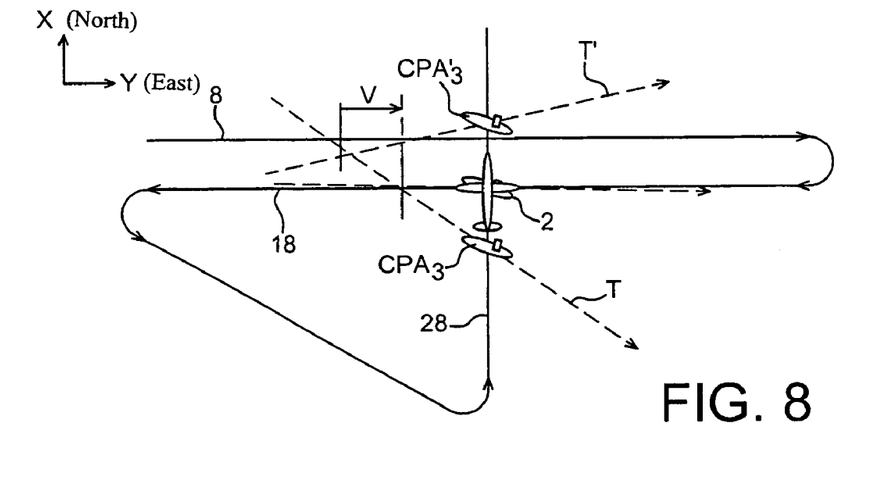

The ordinate (along the Y axis) of this third sweep 28 is calculated so that if the target 2 is actually moving along the axis of the second sweep at a speed V, it will be directly over-flown, above Y, during the third sweep at a certain moment in time t3.

In other terms, the ordinate of the third sweep or of the third trajectory is such that when the aircraft crosses the axis of the second sweep 18, the target 2 will be located, at a later moment in time t3, on the axis of the third sweep, as shown in FIG. 8, assuming that the hypothesis for the trajectory of the target 2 is correct.

In fact, during the third sweep, the aircraft will certainly register or detect another CPA (CPA3 or CPA3'), at a moment in time t'3. This CPA3 will not be detected at either the moment t3 or at the location predicted by the hypothesis (FIG. 8), since this predicted location is in the direction Y.

As a result of these three sweeps it will be possible, however, to approximately estimate the actual trajectory of the target (T or T' in FIG. 8).

It should be recalled that for each CPA, the target is located on the arc of a circle whose centre is at the CPA and whose radius is D in the minimum approach distance plane.

Figure 9:
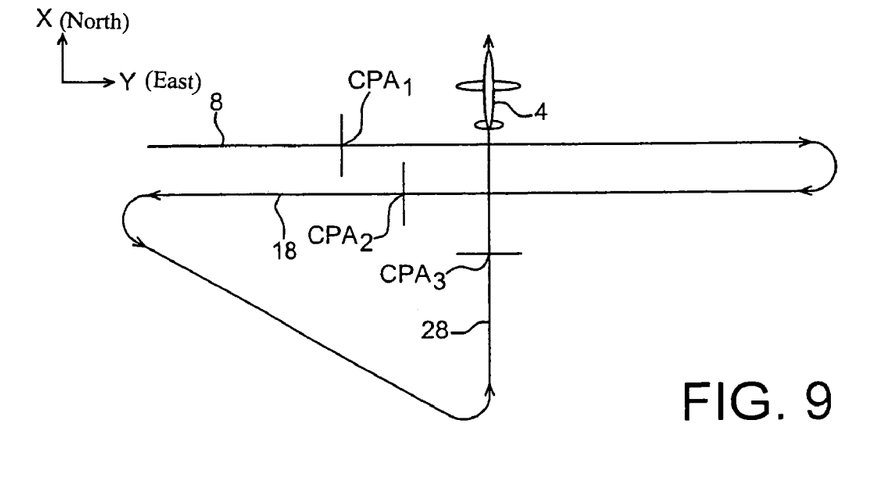

Following the third sweep, three sets of probable passage points for the sub-marine are therefore available (one set for each CPA: see FIG. 9).

Figure 10:
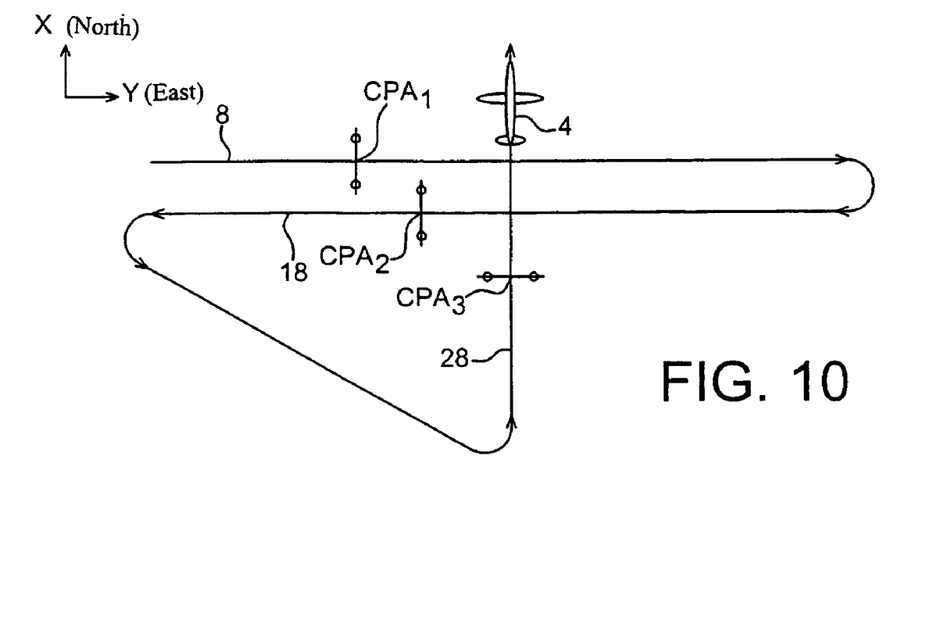

Per depth level, there will be two points per CPA, that is, for 3 CPAS, $2^3=8$ possible paths (FIG. 10)

From these the paths whose three points are the best aligned will be sought; that is, the path which would best correspond to a uniform rectilinear movement. In order to characterise this alignment, one could use a minimisation method, for example a least squares type method (FIG. 11).

Figure 11:
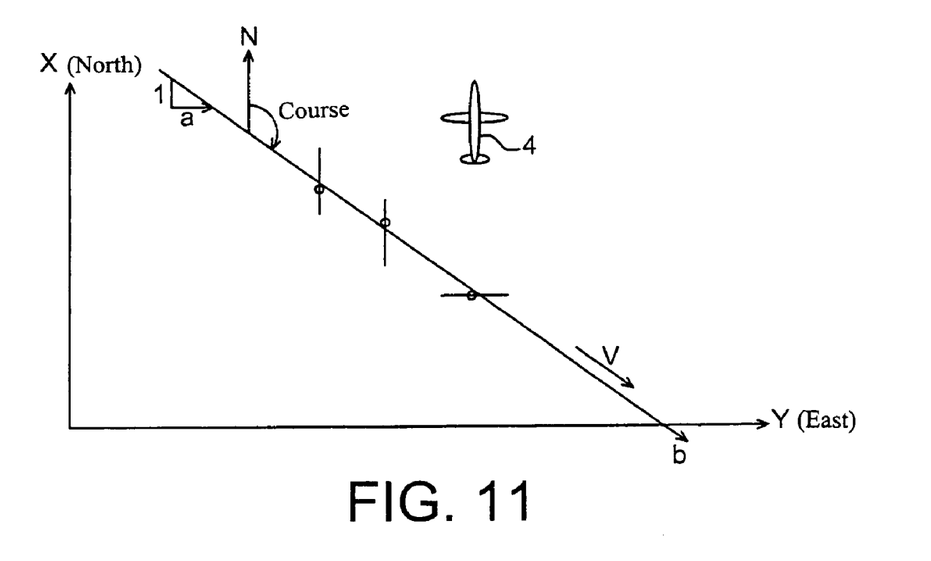

This method provides a path, which includes the best aligned points, in the sense of, for example, the least squares, but also course data, through the direction coefficient a of the line associated with the three points (see FIG. 11).

Knowing the three estimated sweep points and the associated times (t1, t2 and t'3), an estimate is obtained from these of the true speed of the target along its trajectory. In addition, the depth level to which the path which is designated by the minimisation criteria belongs indicates the depth of the target.

Thus a complete set of initial information on the changes in the target is obtained.

At this stage, the procedure provides very good results, obtained from the initial minimisation calculation. The estimate obtained from the third sweep is therefore already very reliable.

However, the estimated or calculated course and speed data can be used to calculate a fourth sweep 38 over the target (FIG. 12), so that the true vertical distance of the latter can be obtained. This fourth sweep will, for example, be parallel and in the opposite direction to the third, after a half-turn.

Figure 12:
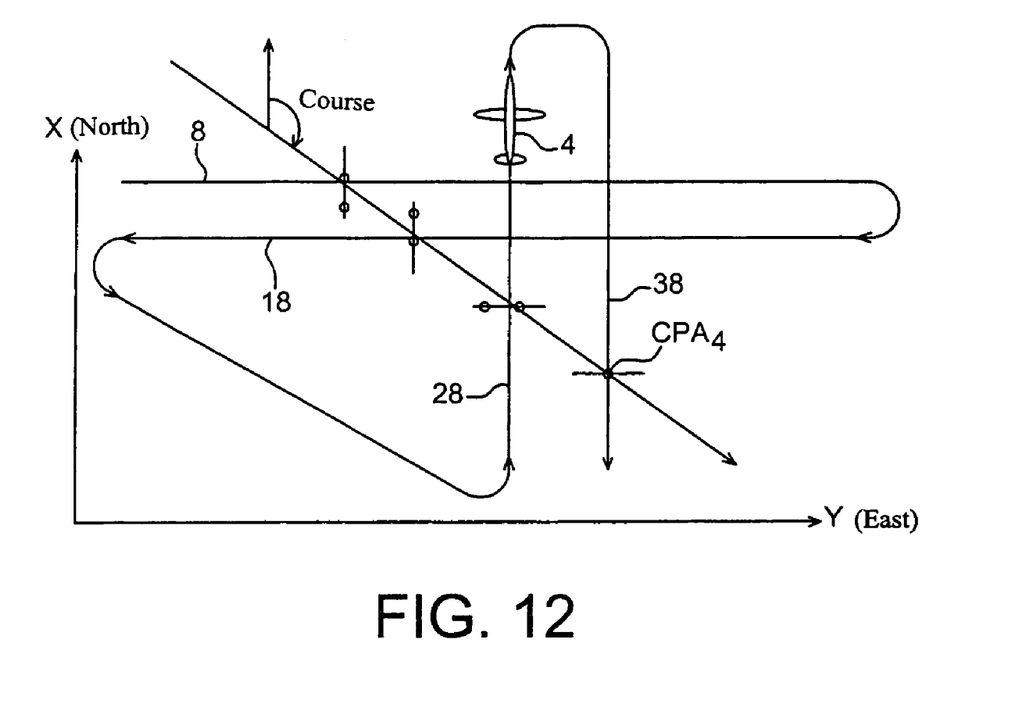

During this sweep, a fourth CPA is recorded (CPA4), close to its expected location (FIG. 12). This therefore gives another set of points.

In order to refine the estimate of the target's trajectory, a minimisation calculation could be repeated, now with four sets of points associated with 4 CPAs which gives $2^4=16$ possible paths per depth level.

A motionless target hypothesis can be included in this procedure. In effect, if the first three CPAs are more or less in the same geographical area, all that is then needed is to bypass the minimisation algorithm, which is now no longer of any use, and to carry out a fourth sweep in the same zone to confirm the position of the target. An average of abscissa and ordinate values could then be obtained in order to estimate the position of the submarine.

The principal advantage of this method is that it can locate moving target, and therefore targets that are a priori hostile (fleeing targets, for example), unlike the current MAD procedure.

Only a single sensor is used, combined with the great mobility of an aircraft rather than a network of fixed sensors.

This method furthermore has the advantage of being rapid: a complete manoeuvre takes of the order of ten minutes for an aircraft flying at 200 Km/hr, for example. In addition, no assumptions are made about the parameters of the target, in particular of its magnetic moment, and it is based solely on the magnetic anomaly produced by the target in the earth's magnetic field.

Figure 13:
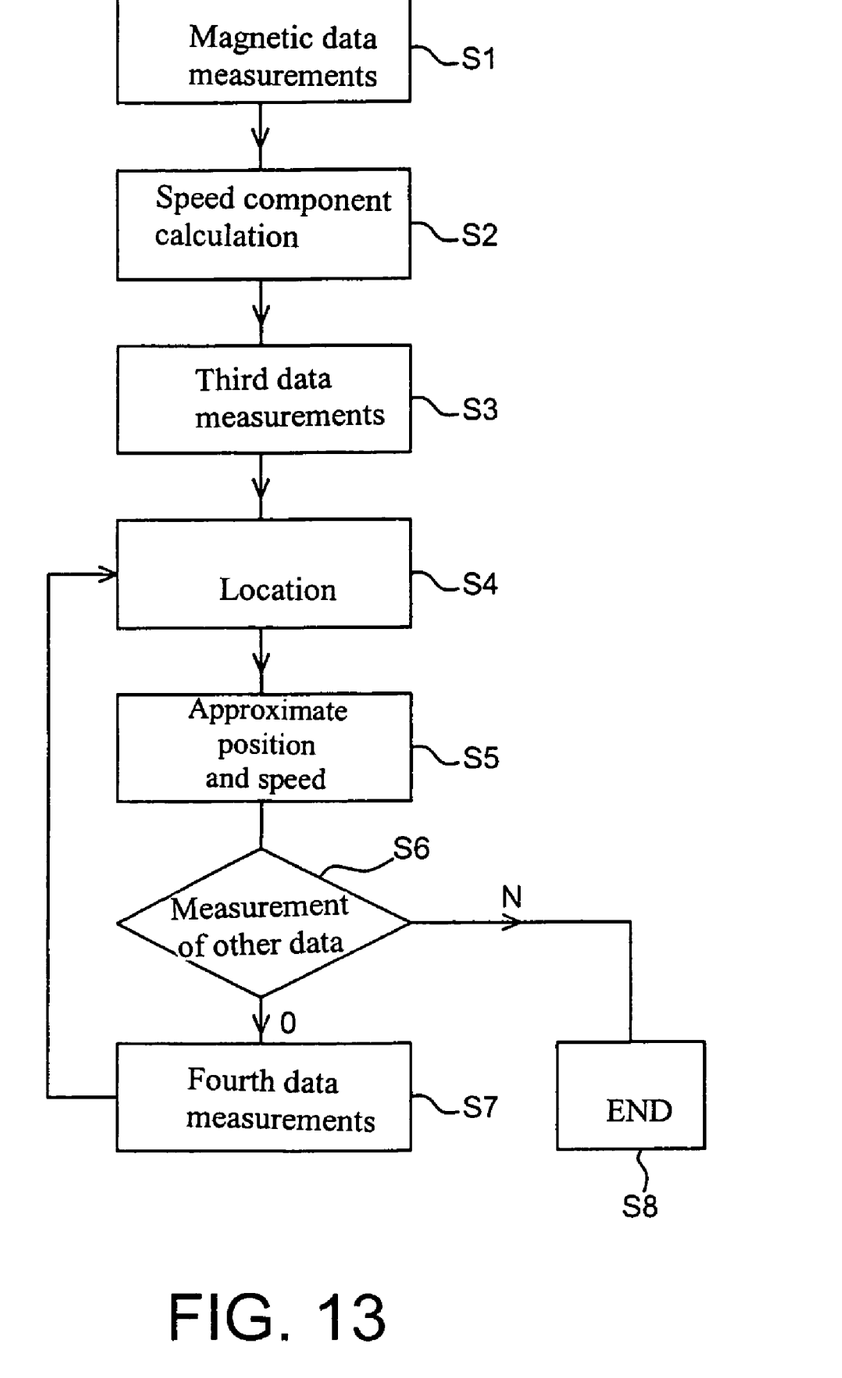
FIG. 13 represents steps in the procedure as described in the invention, FIG. 14 schematically represents a device as described in the invention.

FIG. 13 represents steps in the procedure according to the invention,

In the first step (S1) magnetic field data are measured, for example CPA data (CPA1 and CPA2).

In the second step (s2) a first speed component is calculated, as well as a location or a theoretical position for the target at as a minimum one later moment in time.

The third magnetic field data elements (s3) are measured, following a trajectory 28 assumed to be correct in relation to the location or to the theoretical position.

A first location may then be established (s4).

If the three measured points are observed to coincide, fourth items of magnetic data may perhaps be measured in order to confirm the said location.

Otherwise, an approximation of the target trajectory (s5) is calculated as a function of the measured data.

Operators that have the option to proceed or not with the measurement of other data (s6).

If they decide to measure other data, fourth magnetic data items are measured (s7), in order to confirm the location obtained in s4. These fourth data items are subjected to the same processing as for s4 and s5.

Figure 14:
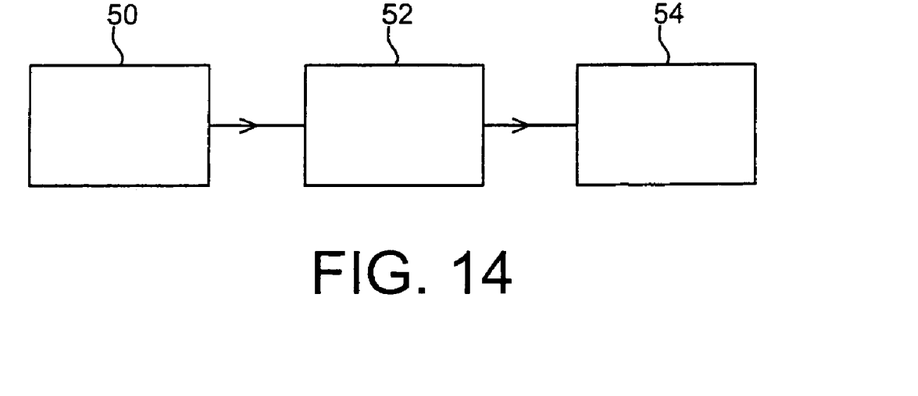

A device for implementing a procedure in accordance with the invention will be described in relation to FIG. 14.

Such equipment may, for example, be placed on board a reconnaissance aircraft.

This device includes a magnetic sensor 50, for example a scalar sensor, for example a Helium 4 sensor, based on the principal of optical pumping of Helium 4. A helium 3 or NMR sensor could also be used.

The advantage of this sensor is that it offers very low noise levels (~1 pT/sqrt(Hz) whereas magnetic signatures of the order of a few 100 pT to a few 100 nT are detected) over the entire frequency band used (up to 500 Hz). It is sufficiently compact to be installed and operated on board a reconnaissance aircraft.

Filtering means 52 allows the location of the CPA to be detected during a rectilinear sweep by the aircraft. A so-called "matched filter" is used. Any magnetic signature may in fact be broken down into three elementary signatures which form the Anderson base. The principle of the matched filter involves projecting the usable signal onto this base, the result being a projection energy, the maximum of which indicates the position of the CPA.

Such a method is described in the thesis by Y. Caritu <<Système de détection/localisation de mobile ferromagnétique par un réseau de magnétomètres haute sensibilité>>, presented on 25 Jun. 1996, Institut National Polytechnique de Grenoble.

Means 54 of calculation enable the optimisation or minimisation calculations to be made to estimate the actual trajectory of the target.

These means include, for example, a micro-computer programmed to carry out the steps in such data processing, for example the steps of the procedure described above, in particular in relation to FIG. 13.

It has been seen that after the third sweep there are 8 possible paths per depth level (and 16 paths after the fourth sweep). In order to determine the target trajectory, a minimisation criterion is used which gives the path which best corresponds to rectilinear motion.

For this a least squares criterion could be used which provides the equation of the solution line.

It is also possible to use a minimisation method other than a least squares method.

The procedure as described in the invention relates in particular to the field of submarine location which is rarely used operationally.

The procedure and equipment as described in the invention allows a novel location strategy for moving magnetic targets to be implemented using a reconnaissance aircraft, without any initial information about the target.

The advantage is that it is then possible to estimate the trajectory of a moving target using a mobile sensor, for example a single mobile sensor, and the ability of an aircraft to cover large areas.

The fact that the target may be mobile has also been taken into consideration. This method can therefore be used not only in a relocation context but actually for pure location.

One difference in the invention in relation to existing techniques, and particularly in relation to that described in document U.S. Pat. No. 5,387,853, which uses fixed sensors, is that the procedure and device as described in the invention uses one or more mobile sensors.

The invention claimed is:

1. A method for locating a mobile magnetic target using magnetic measurements performed with mobile magnetic detection means, which includes:
   a)—a determination at a moment in time $t_1$ of a first position range of said mobile target with said mobile magnetic detection means, and a second position range of said mobile target at a later moment in time $t_2$, with said mobile magnetic detection means,
   b) calculation of a target velocity component of said mobile magnetic target along a direction and of a theoretical position range of the target with respect to a trajectory of said mobile magnetic detection means, defined relative to said direction as a function of said velocity component, at a subsequent theoretical moment in time $t_3$,
   c)—a determination of a third position range of said mobile magnetic target with said mobile magnetic detection means moving along said theoretical position range, and a determination of an approached position and of the trajectory of said mobile magnetic target, as a function of said first, second and third position ranges.

2. A method as in claim 1, wherein:
   said step a) comprises:
   measuring a magnetic field with said mobile magnetic detection means moving along a first direction,
   measuring a magnetic field with said mobile magnetic detection means moving along another direction, opposite said first direction,
   said step b) comprising calculating said target velocity component along said first or second direction, said step c) comprising measuring a magnetic field with said mobile magnetic detection means moving along said theoretical position range, and determining at a real moment in time t'3 said third position range.

3. A method as in claim 2, further comprising the determination of:
   a value D1 of the distance between said first position range of said target and said magnetic detection means,
   the value D2 of the distance between said second position range of said target and said magnetic detection means.

4. A method as in claim 1, said theoretical position range being perpendicular to said first direction.

5. A method as in claim 1, said step c) being an optimisation step.

6. A method as in claim 5, said step c) being carried out using minimisation.

7. A method as in claim 6, said optimisation step being carried out using the least squares method.

8. A method as in claim 1, which includes measurements of a field B4 along another trajectory opposite to said trajectory.

9. A method as in claim 8, further comprising a determination step of a moment in time t4 associated with a point P4 and for calculating the distance D4 between P4 and said target.

10. A method as in claim 1, said magnetic measurements being made using a scalar magnetometer.

11. A method as in claim 10, said measurements being made with the aid of a Helium 4 sensor.

12. A method as in claim 1, said determined first and second positions ranges being the closest points to the target (CPAi) for each of a plurality of trajectories of said mobile magnetic detection means.

13. A method as in claim 12, said closest points being determined using matched filtering.

14. A method as in claim 1, said target being a submarine.

15. A method as in claim 1, said target being detected with the aid of an aircraft.

16. A method according to claim 1, said magnetic measurements being made with help of detection means movable with respect to said target.

17. A device for locating a mobile magnetic target, said device comprising:
   a)—a magnetic sensor,
   b)—a filter filtering signals produced by said magnetic sensor,
   c)—means for determining an approach distance position of said target and of its speed, as a function of data produced by said filtering means relative to first, second and third position ranges, resulting from:
      a determination at a first instant of said first position range of said mobile target with said magnetic measurement means moving, and of said second position range of said mobile target at a later second instant, with said mobile magnetic detection means moving;
      a calculation of a target velocity component of said mobile magnetic target along a direction and of a theoretical third position range of the target with respect to a specified trajectory of said mobile magnetic detection means, as a function of said velocity component, at a subsequent theoretical moment in time t3,
      a determination of said third position range of said mobile magnetic target with said mobile magnetic detection means moving along said theoretical position range.

18. A device as in claim 17, said magnetic measurements means comprising a magnetic sensor.

19. A device as in claim 18, said magnetic measurements means comprising a magnetic scalar sensor.

20. A device as in claim 19, said sensor comprising a Helium 4 sensor.

21. A device as in claim 17, said means determining an approach position and a speed comprising optimising means optimising data produced by said filtering means.

22. A device as in claim 21, said optimising means comprising minimisation means.

23. A device as in claim 17, said third position range being located along said theoretical position range defined, in relation to said direction, as a function of a first possible speed of the target along said direction and of a later moment in time t3.

24. A method for locating a mobile magnetic target using magnetic measurements performed with mobile magnetic detection means, the method comprising:
   a) using the mobile magnetic detection means to determine first and second position ranges of the magnetic target relative to the mobile magnetic detection means at first and second moments in time during which the mobile magnetic detection means has moved in opposite directions between first and second locations, the first moment in time corresponding to the first location of the mobile magnetic detection means and the second moment in time corresponding to the second location of the mobile magnetic detection means;
   b) calculating a target velocity component of said mobile magnetic target along a target direction and a theoretical position range of the target with respect to a trajectory of said mobile magnetic detection means, defined relative to said target direction as a function of said velocity component, at a subsequent theoretical moment in time $t_3$; and
   c) determining a third position range of said mobile magnetic target at a real moment in time $t'_3$ with said mobile magnetic detection means moving along said theoretical position range, and determining an approached position and the trajectory of said mobile magnetic target, as a function of said first, second and third position ranges of the magnetic target relative to the mobile magnetic detection means.

25. A method as in claim 24, wherein said determined position ranges are the closest points to the target (CPA) for each of a plurality of trajectories of said mobile magnetic detection means.

26. A method as in claim 24, further comprising determining:
   a value D1 of the distance between said first position range of said target and said magnetic detection means,
   the value D2 of the distance between said second position range of said target and said magnetic detection means.

27. A method as in claim 24, further comprising measuring of a field B4 along another trajectory opposite to said trajectory.

28. A method as in claim 27, further comprising determining a moment in time $t_4$ associated with a point P4 and for calculating the distance D4 between P4 and said target.

29. A method as in claim 24, wherein magnetic measurements are made using a scalar magnetometer.

30. A device for locating a mobile magnetic target, said device comprising:
   a) a magnetic sensor,
   b) a filter filtering signals produced by said magnetic sensor,
   c) means for determining an approach position of said target and of its speed, as a function of data produced by said filtering means relative to first, second and third position ranges, resulting from:

using the mobile magnetic detection means to determine the first and second position ranges of the magnetic target relative to the mobile magnetic detection means at first and second moments in time during which the mobile magnetic detection means has moved in opposite directions between first and second locations, the first moment in time corresponding to the first location of the mobile magnetic detection means and the second moment in time corresponding to the second location of the mobile magnetic detection means;

calculating a target velocity component of said mobile magnetic target along a target direction and a theoretical position range of the target with respect to a trajectory of said mobile magnetic detection means, defined relative to said target direction as a function of said velocity component, at a subsequent theoretical moment in time $t_3$; and determining the third position range of said mobile magnetic target at a real moment in time $t'_3$ with said mobile magnetic detection means moving along said theoretical position range, and determining an approached position and the trajectory of said mobile magnetic target, as a function of said first, second and third position ranges of the magnetic target.

31. A device as in claim 30, wherein said determined position ranges are the closest points to the target (CPA) for each of a plurality of trajectories of said mobile magnetic detection means.

32. A device as in claim 30, wherein the approach distance position of said target is further determined as function of determining:
  a value D1 of the distance between said first position range of said target and said magnetic detection means,
  the value D2 of the distance between said second position range of said target and said magnetic detection means.

33. A device as in claim 30, wherein the approach distance position of said target is further determined as function of measuring of a field B4 along another trajectory opposite to said trajectory.

34. A device as in claim 33, wherein the approach distance position of said target is further determined as function of determining a moment in time $t_4$ associated with a point P4 and for calculating the distance D4 between P4 and said target.

35. A device as in claim 30, wherein the magnetic measurements are made using a scalar magnetometer.

* * * * *

UNITED STATES PATENT AND TRADEMARK OFFICE
CERTIFICATE OF CORRECTION

PATENT NO. : 7,579,828 B2  Page 1 of 1
APPLICATION NO. : 11/290790
DATED : August 25, 2009
INVENTOR(S) : Laforest et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Fourteenth Day of September, 2010

David J. Kappos
*Director of the United States Patent and Trademark Office*